Oct. 6, 1964

B. L. WARD 3,151,895

RIGHT ANGLED TUBE COUPLING FOR CONNECTING
A HOSE TO A PIPE

Filed Feb. 7, 1962

Bryant L. Ward
INVENTOR.

BY *Clarence A. O'Brien*
*and Harvey B. Jacobson*
Attorneys

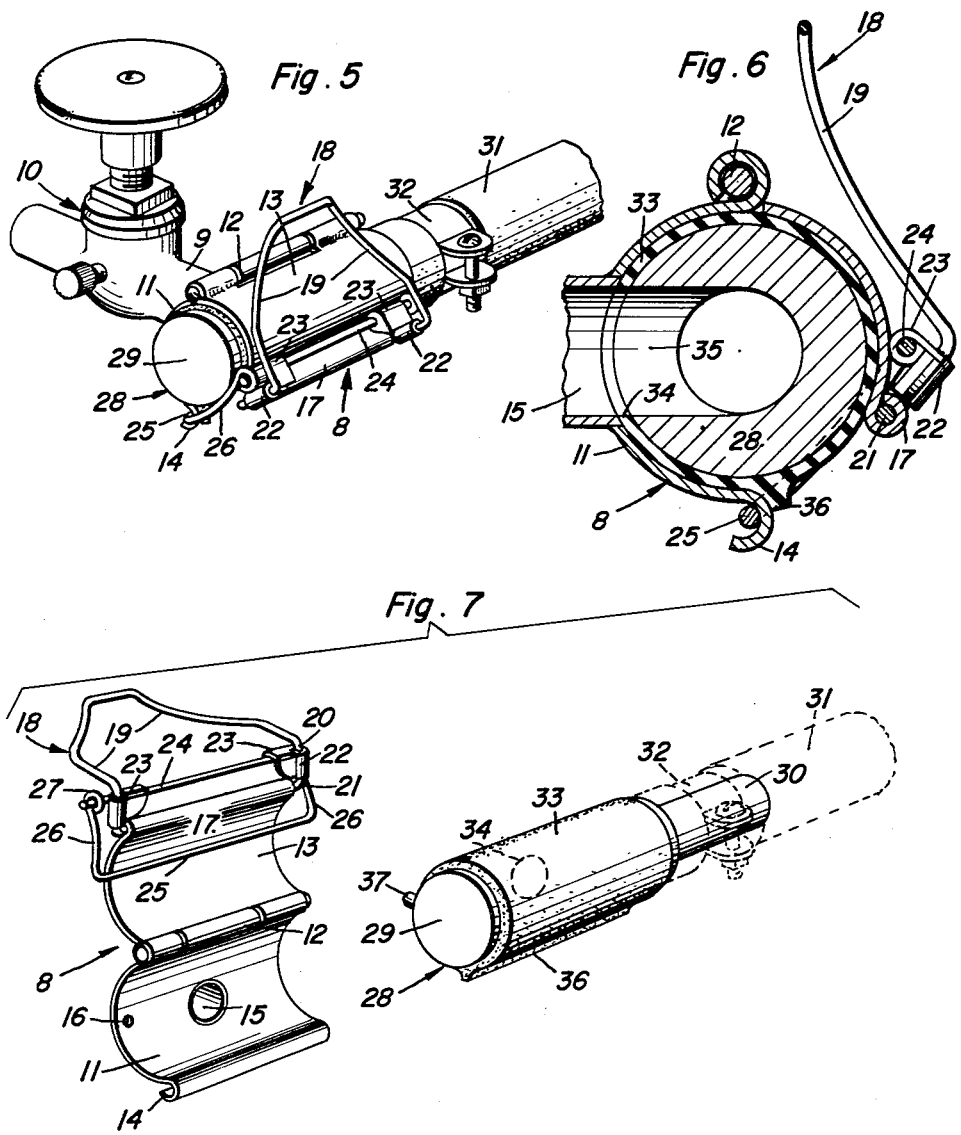

United States Patent Office 3,151,895
Patented Oct. 6, 1964

3,151,895
RIGHT ANGLED TUBE COUPLING FOR
CONNECTING A HOSE TO A PIPE
Bryant L. Ward, 6823 Sherman St., Philadelphia, Pa.
Filed Feb. 7, 1962, Ser. No. 171,657
5 Claims. (Cl. 285—197)

This invention generally relates to garden hose, small fire hose, etc., and has for its primary object to provide, in a manner as hereinafter set forth, novel means whereby such flexible conduits may be expeditiously connected to a supply valve without the usual tedious screwing or turning operation.

Another important object of the present invention is to provide a threadless "speed" coupling of the aforementioned character which will permit the hose to be tightly connected to a valve and disconnected therefrom without the necessity of using tools.

Still another object of the invention is to provide a coupling of the character described comprising a novel clamp which is functionally designed and structurally adapted to be readily mounted on a conventional valve.

Other objects of the invention are to provide a hose and valve coupling or connector of the character set forth which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a perspective view, showing the device in use;

FIGURE 6 is a vertical sectional view through the device, taken at right angles to FIGURE 4; and FIGURE 7 is a perspective view of the device per se, showing the clamp in open position and separated from the hose coupling member.

Figure 1:
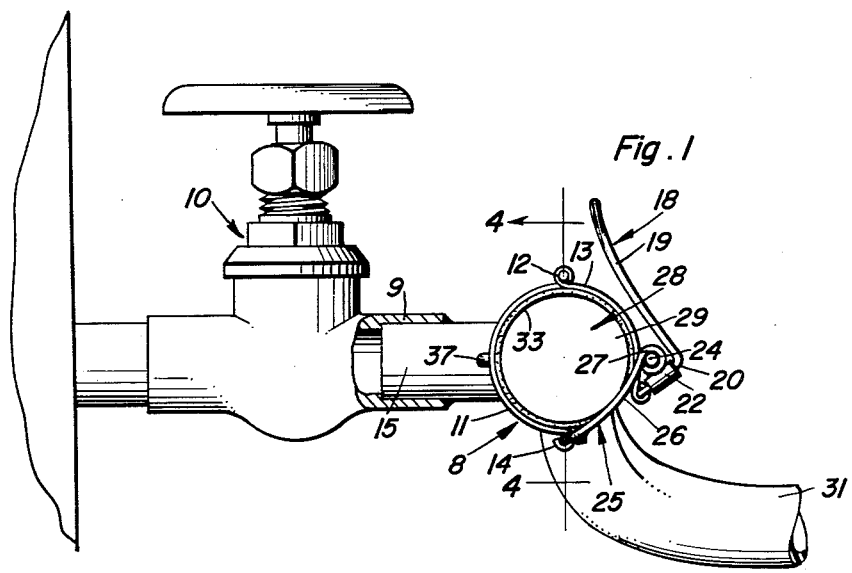
FIGURE 1 is a view principally in side elevation, partially in section, showing a coupling constructed in accordance with the present invention in use.

Referring now to the drawing in detail, it will be seen that the embodiment of the invention which has been illustrated comprises a metallic clamp which is designated generally by reference numeral 8. The clamp 8 is adapted to be mounted on the discharge or outlet end portion 9 of a water supply valve 10.

The clamp 8 includes an elongated stationary jaw 11 of substantially semi-circular cross-section. Secured by a piano-type hinge 12 on one end of the stationary jaw 11 is a pivoted or swinging jaw 13. The jaw 13 is also of arcuate cross-section. The free end portion of the stationary jaw 11 is reversely rolled or bent in a manner to provide a hook 14. Fixed in an opening provided therefor in the jaw 11 and projecting outwardly therefrom is a tube or nipple 15 which is engageable in the end portion 9 of the valve 10 for mounting the clamp 8 thereon. Adjacent one of its side edges the jaw 11 is further provided with a perforation or hole 16 the purpose of which will be presently set forth.

The free end portion of the pivoted jaw 13 of the clamp 8 is rolled in a manner to provide a loop or tube 17. Mounted for swinging movement of the free end of the pivoted jaw 13 is a generally V-shaped lever 18 of suitable wire. The arms or legs 19 of the lever 18 comprise angularly bent end portions 20 terminating in inturned trunnions 21 which are journaled in the loop or tube 17.

In the embodiment shown, brackets 22 or mounted on the angularly extending portions 20 of the lever 18. The brackets 22 include aligned sleeves or eyes 23 in which a transverse shaft 24 is mounted. The end portions of the shaft 24 project beyond the brackets 22 and journaled thereon is a loop or bail 25 which is engageable in the hook 14 for operatively connecting the lever 18 to the stationary jaw 11. The legs 26 of the loop or bail 25 terminate in eyes 27 which receive the end portions of the shaft 24.

Figure 4:
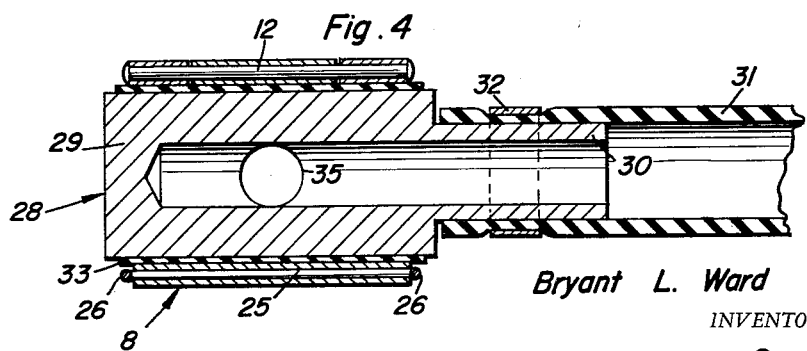
FIGURE 4 is a vertical sectional view on an enlarged scale, taken substantially on the line 4—4 of FIGURE 1.

The clamp 8 is for the reception of a cylindrical tubular hose coupling 28 of suitable metal. As shown to advantage in FIGURE 4 of the drawing, the hose coupling 28 includes a closed end 29. Projecting longitudinally from the other end of the coupling 28 is an axially projecting smooth or unthreaded neck 30 which is reduced in cross-section and is insertable in an end portion of a conventional hose 31 where it is secured by a suitable clamp 32.

Mounted on the cylindrical hose coupling 28 is a tubular gasket or bushing 33 of suitable resilient material. The bushing 33 has formed therein at an intermediate point a circular opening 34 which communicates the nipple 15 with a radial intake opening 35 at an intermediate point in the hose coupling member 28. The bushing 33 further comprises a longitudinal rib 36 which is adapted to rest on the hook 14 of the stationary jaw 11. Mounted radially on the hose coupling member 28 adjacent the closed end 29 thereof and projecting through the bushing 33 is a positioning or locating pin 37 which is engageable in the hole 16 of the jaw 11.

Figure 2:
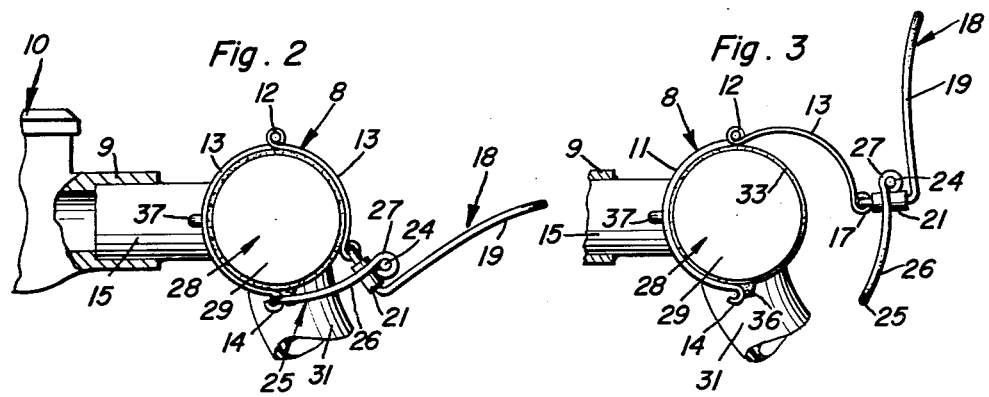
FIGURE 2 is a similar view, showing the first step taken when disconnecting the hose from the valve.
Figure 3:
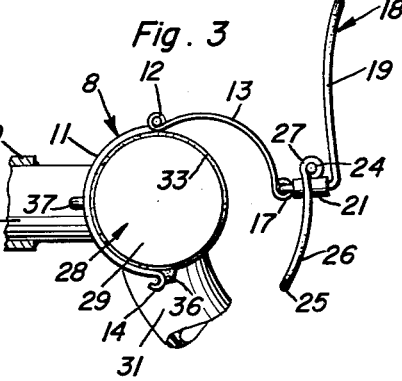
FIGURE 3 is a fragmentary view substantially similar to FIGURE 2 but showing the second step taken when disconnecting the hose.

It is thought that the use of the device will be readily apparent from a consideration of the foregoing. Briefly, the nipple or the like 15 may, if desired, be fixed in any suitable manner in the discharge end portion or spout 9 of the valve 10 for mounting the clamp 8 on said valve. To connect the hose 31, with the coupling 28 thereon, to the valve 10, said coupling 28 with the bushing 33 thereon is seated longitudinally in the stationary jaw 11 of the open clamp 8. With the coupling 28 thus seated in the jaw 11 and with the pin 37 engaged in the hole 16, the openings 35 and 34 are aligned with the nipple 15. The loop or bail 25 is then engaged in the hook 14 of the stationary jaw 11 substantially as shown in FIGURE 2 of the drawing. Then, the lever 18 is swung counterclockwise to the position of FIGURE 1 of the drawing. The construction and arrangement is such that when the lever 18 is swung toward the position of FIGURE 1, said lever snaps past dead center for tightly closing the clamp on the coupling 28 and squeezing the bushing or gasket 33 between the jaws 11 and 13 of said clamp. When the coupling 28 with the bushing 33 thereon is thus squeezed in the clamp 8 leakage is positively prevented. Of course, to disconnect the hose 31 the foregoing procedure is substantially reversed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For connecting a hose to a valve, a clamp comprising a stationary jaw, a swinging jaw hingedly mounted on one end of the stationary jaw, a nipple on the stationary jaw engageable in a valve in communication therewith for mounting the clamp thereon, a coupling removably mounted in the clamp and adapted to be connected to a hose in communication therewith, said coupling including a tubular cylindrical member having an opening therein communicating with the nipple, and means for closing the clamp on the coupling, said coupling further including a cylindrical tubular compressible bushing on said member having an opening therein aligned with the first-named opening, said coupling still further including a pin projecting from said member, said clamp having an opening therein receiving the pin for positioning the coupling in said clamp with said openings in alignment with said nipple, said bushing having a longitudinal rib engageable with the free ends of the jaws, said rib having a length substantially equal to the length of said jaws.

2. A connector in accordance with claim 1, said closing means including a hook on the free end of the stationary jaw, a generally V-shaped lever pivotally mounted on the free end of the swinging jaw, transversely aligned sleeves mounted on the arms of said lever, a shaft mounted in said sleeves, and a loop pivotally mounted on the end portions of the shaft astraddle the lever and engageable in the hook for operatively connecting said lever to the stationary jaw.

3. For connecting a hose to a valve, a clamp comprising a pair of jaws hingedly connected at one end for receiving and gripping a hose therebetween, a nipple on one of the jaws for connection to a valve, said clamp further comprising a hook on the free end of said one jaw, a tube on the free end of the other jaw, a generally V-shaped lever for closing the jaws, said lever including arms comprising angulated end portions terminating in inturned trunnions journaled in the end portions of the tube, a generally U-shaped loop, means for pivotally mounting the loop on the lever, said loop being engageable with the hook for operatively and detachably connecting the lever to said one jaw, said means comprising brackets mounted on the angulated end portions of said arms and including aligned sleeves, a shaft mounted in said sleeves, and eyes on the ends of the loop journaled on the end portions of the shaft.

4. For use in separably connecting a hose to a discharge neck on a cutoff valve: a hose coupling comprising an elongated tubular cylindrical member closed at one end and provided at its other end with an integral axially projecting reduced neck, said neck being adapted to be fitted telescopingly into an end portion of said hose, said member being provided on one side between its respective ends with an intake port, said member also being provided on said one side adjacent said closed end with an integral radially projecting locating and positioning pin, a tubular cylindrical resilient bushing snugly surrounding said member and of a length corresponding to the length of said member and having an opening therein in alignment with said port, a clamp for said member and bushing thereon, said clamp comprising a pair of elongated jaws of equal length having corresponding ends pivotally connected together, the other ends of said jaws being free and spaced apart, said jaws being commensurate in length with and clampingly receiving said bushing and member therebetween, one of said jaws having a pin receiving hole and also having a fixed outstanding nipple in communication with said opening and also said port, said nipple being oriented with said hole and adapted to be fixed to the valve's discharge neck, and means carried by and for opening, closing, and clamping said jaws tightly around said bushing, and said bushing having an integral longitudinally extending abutment rib on its peripheral surface situated in the space between the free ends of said jaws and positively abutting the free end of one of said jaws.

5. The structure defined in claim 4, and wherein said nipple is of a predetermined length and transverse cross-section, is externally smooth and adapted to be telescopingly fitted into the aforementioned valve neck and fixed thereto, said rib being oriented with respect to said port and said pin and said rib being of a length commensurate with the length of the free end of said one jaw.

References Cited in the file of this patent

UNITED STATES PATENTS

| | | |
|---|---|---|
| 887,051 | Wiest | May 5, 1908 |
| 982,028 | Austin | Jan. 17, 1911 |
| 1,570,887 | Graves | Jan. 26, 1926 |
| 1,803,578 | Weatherhead | May 5, 1931 |
| 1,959,630 | Keitel | May 22, 1934 |
| 2,331,132 | Nadelson | Oct. 5, 1943 |
| 2,390,801 | Markey | Dec. 11, 1945 |
| 2,783,771 | Thomas | Mar. 5, 1957 |
| 3,010,739 | Boudreau | Nov. 28, 1961 |
| 3,120,965 | MacDonald | Feb. 11, 1964 |

FOREIGN PATENTS

| | | |
|---|---|---|
| 51,603 | Austria | Jan. 10, 1912 |